US005723050A

United States Patent [19]

Unger et al.

[11] Patent Number: 5,723,050

[45] Date of Patent: Mar. 3, 1998

[54] BAG SET FOR USE IN CENTRIFUGAL SEPARATION

[75] Inventors: Peter Unger, Stockholm; Eric Westberg, Lidingo, both of Sweden

[73] Assignee: Omega Medicinteknik AB, Sweden

[21] Appl. No.: 578,585

[22] PCT Filed: Jun. 28, 1994

[86] PCT No.: PCT/SE94/00638

§ 371 Date: Jan. 3, 1996

§ 102(e) Date: Jan. 3, 1996

[87] PCT Pub. No.: WO95/01842

PCT Pub. Date: Jan. 19, 1995

[30] Foreign Application Priority Data

Jul. 8, 1993 [SE] Sweden .................................. 9302369

[51] Int. Cl.[6] .................................................. B01D 21/26

[52] U.S. Cl. ......................... 210/772; 210/782; 210/787; 210/360.1; 210/380.1; 422/72; 422/101; 494/27; 494/34; 494/45; 604/410

[58] Field of Search ..................................... 604/408, 409, 604/410; 210/380.1, 360.1, 772, 782, 781; 422/72, 101; 494/30, 34, 27, 42, 45, 84

[56] References Cited

U.S. PATENT DOCUMENTS

| | | |
|---|---|---|
| 3,724,747 | 4/1973 | Unger et al. . |
| 3,858,796 | 1/1975 | Unger et al. . |
| 3,987,961 | 10/1976 | Sinn et al. . |
| 4,230,263 | 10/1980 | Westberg . |
| 4,990,132 | 2/1991 | Unger et al. . |
| 5,114,396 | 5/1992 | Unger et al. . |

FOREIGN PATENT DOCUMENTS

| | | |
|---|---|---|
| 354581 | 3/1973 | Sweden . |
| 87/06844 | 11/1987 | WIPO . |
| WO 87/06857 | 11/1987 | WIPO . |
| WO 89/02273 | 3/1989 | WIPO . |

*Primary Examiner*—David A. Reifsnyder

*Attorney, Agent, or Firm*—Lerner, David, Littenberg, Krumholz & Mentlik

[57] ABSTRACT

Apparatus for centrifugal separation of liquid mixtures is disclosed including an inner circular bag and an outer annular bag which has an inner diameter corresponding to the outer diameter of the inner circular bag, a connecting channel for providing fluid communication between the inner and outer bags, and a rigid circular mount for mounting the outer annular bag for centrifugation in a manner such that the outer annular bag adopts a conical configuration by shortening its inner diameter. Methods for centrifugal separation of thrombocyte suspensions and bone marrow cells using this apparatus are also disclosed.

18 Claims, 5 Drawing Sheets

BAG SET FOR USE IN CENTRIFUGAL SEPARATION

FIELD OF THE INVENTION

The present invention relates to a bag-set intended for batch centrifugal separation. More particularly, the present invention relates to a bag-set of the type which comprises an essentially ring-shaped outer bag and an inner bag, formed from the central part of the ring, as well as one or more connecting channels between the interiors of these bags.

BACKGROUND OF THE INVENTION

Systems of coupled bags have been used for the centrifugal separation of blood, blood products and other biological fluids. In these systems, the fluid which is to be separated is supplied to a primary bag of the system and after centrifugation and separation of the fluid into two or more fractions, one or more of these fractions is pressed into the attached or secondary bags. For use in centrifugal separation, specially adapted round and ring-shaped or annular bags are known in this connection. Bag systems of this type are described e.g. in U.S. Pat. Nos. 4,990,132 and 5,114,396. These documents also disclose how this type of bag-system can be manufactured from plastic films which are superimposed on one another and joined by means of an outer ring-shaped seam and an inner ring-shaped seam, so that a ring-shaped or annular outer bag is formed as well as a plate-shaped or circular inner bag in the central portion of the ring. It is also possible for several chambers to be arranged, one upon the other, in the inner bag, depending on the number of film layers which are sealed together. The inner seam is suitably provided with perforations so that the outer and inner bags can be separated from each other.

The fluid which is to be separated can thus be supplied to the outer ring-shaped bag and after centrifugation is subjected to an external pressure which presses the fraction which is closest to the center of the rotor, through the connecting channel, to the inner bag. Several different combinations of connected channels can be employed if the inner bag comprises a plurality of chambers. Different methods are also known for achieving the compressive pressure on the bag while it is in the rotor and undergoing rotation.

From a point of view of cost it is advantageous if the inner bag can be manufactured from film material which is obtained from the remaining central portion of the outer bag. If a large volume is required for the inner bag, this means, however, that the diameter of the outer bag will be large, which is a disadvantage with many applications and requires centrifuges with large rotor diameters.

It is therefore an object of the present invention to provide an improved bag-system of the aforementioned type which provides increased flexibility as regards the choice of the volume of the inner bag and the diameter of the outer bag.

This and other objects and advantages which are described in more detail in the following description, are achieved by a bag-system hereof.

SUMMARY OF THE INVENTION

In accordance with the present invention, these and other objects have now been accomplished by the invention of centrifugal separation apparatus, primarily for the separation of biological fluids, comprising an inner circular bag portion having an outer diameter, an outer annular bag portion having an inner diameter corresponding to the outer diameter of the inner circular bag portion, a connecting channel for providing fluid communication between the inner circular bag portion and the outer annular bag portion, and central mounting means comprising a rigid circular mounting member for mounting the outer annular bag portion for centrifugation in a manner such that the outer annular bag portion adopts a conical configuration by shortening the inner diameter of the outer annular bag portion.

In a preferred embodiment, the inner circular bag portion and the outer annular bag portion are detachably formed from integral bag forming material. In a preferred embodiment, the apparatus includes a plurality of connecting channels.

In accordance with another embodiment of the centrifugal separation apparatus of the present invention, the outer annular bag portion includes an interrupted portion, and further includes a pair of end portions defining the interrupted portion, whereby the outer annular bag portion adopts the conical configuration by wrapping the pair of end portions over each other to thereby shorten the inner diameter of the outer annular bag portion.

In a preferred embodiment, the interrupted portion of the outer annular bag portion has a predetermined length defined by a pair of cuts in the outer annular bag portion to remove a predetermined length of the inner diameter of the outer annular bag portion.

In accordance with another embodiment of the centrifugal separation apparatus of the present invention, the outer annular bag portion includes a folded portion whereby the outer annular bag portions adopts the conical configuration.

In accordance with another embodiment of the centrifugal separation apparatus of the present invention, the central mounting means includes an inner cavity for mounting the inner circular bag portion, the inner cavity being dimensioned so that when the inner circular bag portion is mounted therein, the inner circular bag portion can be filled with a fluid by expansion in an axial direction but radial expansion of the inner circular bag portion is restricted.

In accordance with another embodiment of the centrifugal separation apparatus of the present invention, the inner circular bag portion includes first and second axially disposed compartments, and the connecting channel comprises a first connecting channel portion for providing fluid communication with the first axially disposed compartment and a second connecting channel portion provides fluid communication with the second axially disposed compartment.

In a preferred embodiment, the first and second connecting channel portions comprise separate connecting channel members. In another embodiment, the first and second channel portions comprises separate branches of a single connecting channel.

In accordance with another embodiment of the centrifugal separation apparatus of the present invention, the apparatus comprises an inner circular bag portion having an outer diameter, an outer annular bag portion for arrangement concentrically around the inner circular bag portion, the outer annular bag portion having an outer diameter defining a central point, and a connecting channel providing fluid communication between the inner circular bag portion and the outer annular bag portion, the connecting channel being connected to the outer annular bag portion at a connecting point thereon which is displaced inwardly toward the central point so that the distance between the central point and the connecting point is less than the outer diameter of the inner circular bag portion.

In a preferred embodiment, the inner circular bag portion and the outer annular bag portion are detachably formed from integral bag forming material. Preferably, a plurality of connecting channels are provided.

In accordance with another embodiment of the centrifugal separation apparatus of the present invention, the outer annular bag portion includes a radially inwardly projecting portion, and the connecting point is located in the radially inwardly projecting portion.

In accordance with another embodiment of the centrifugal separation apparatus of the present invention, the outer annular bag portion is eccentrically disposed with respect to the inner circular bag portion, whereby the outer annular bag portion includes a first width on a first side thereof and a second width on a second opposite side thereof, the first width being greater than the second width, and the connecting point being located at the first width.

In a preferred embodiment, the connecting point is located adjacent to the inner diameter of the outer annular bag portion.

In accordance with the present invention, a method is also provided for centrifugal separation of thrombocyte suspensions from buffycoat fractions utilizing an inner circular bag portion having an outer diameter and an outer annular bag portion having an inner diameter corresponding to the outer diameter of the inner circular bag portion, the method including connecting the inner and outer bag portions for fluid communication therebetween, mounting the annular bag portion for centrifugation in a manner such that the outer annular bag portion adopts a conical configuration by shortening the inner diameter of the outer annular bag portion, and conducting the centrifugation for obtaining thrombocyte suspensions and separating the thrombocyte suspensions from the outer annular bag portion to the inner circular bag portion.

In accordance with the present invention, methods are also provided for centrifugal separation of bone marrow cells from bone marrow suspensions utilizing an inner circular bag portion having an outer diameter and an outer annular bag portion arranged concentrically around the inner circular bag portion, the outer annular bag portion having an outer diameter defining a central point, the method comprising connecting the inner circular bag portion to the outer annular bag portion for fluid communication therebetween at the outer annular bag portion at a connecting point therein which is displaced inwardly towards the central point so that the distance between the central point and the connecting point is less than the outer diameter of the inner circular bag portion, thereby separating the bone marrow cells from the bone marrow suspension, and separating the bone marrow cells into the inner circular bag portion therefrom. In a preferred embodiment, this method includes separating the bone marrow suspensions into three fractions including a intermediate buffycoat suspension, separating the intermediate buffycoat fraction into three separate fractions including a bone marrow containing intermediate fraction, and washing the bone marrow containing intermediate fraction.

In accordance with the present invention, the bag-set comprises an essentially ring-shaped outer bag and an inner bag, formed from the central part of the ring and preferably being detachable from the ring, as well as one or more connecting channels between the interiors of these bags. According to the present invention the bag-system further comprises a rigid, circular mounting member on which the outer bag is mounted in a position for centrifugation whereby the outer bag is given a conical shape around the mounting member by means of a contractive ring-shortening.

The mounting member also performs the function of facilitating the handling of the bag-set, as well as fixing the inner bag in its intended position for centrifugation. The mounting member has an inner cavity, in which the inner bag is placed in a manner which limits its radial expansion but which permits expansion in the axial direction when it is filled with fluid. The inner cavity has a diameter which is less than the diameter of the inner bag, whereby the inner bag is pressed into the cavity so that its peripheral part curves along the walls of the cavity. The center part preferable has essentially the form of a downwardly-open cylinder.

The contractive ring-shortening of the outer bag can be achieved by a section of the ring being gathered together into a fold. The inner ring-shaped fluid communication in the bag is thereby blocked. The fold can be placed on the ring so that two overlapping bag ends are obtained, as well as a material piece between the bag ends which remains empty and blocked for fluid flow. The outer bag can also be cut and the resulting free ends sealed. The shortening of the bag can then be achieved by drawing the ends together so that they overlap each other. The bag can also be cut in two places and the intermediate material piece removed, whereby the free ends are drawn towards each other in a corresponding manner until they overlap.

Due to the fact that the circular-shaped fluid communication in the outer bag is blocked or interrupted, a flow of the fluid around the bag when the centrifuge accelerates or retards is prevented, which accelerates commencement of the separation procedure and prevents silting up when the rotor is slowed down.

The separation chamber in the rotor is adapted to the conical form of the shortened outer bag. In view of the fact that separation occurs in a radial direction in a relatively narrow conical chamber, an angular separation effect, as well as a fast separation, are achieved. The separation path in the radial direction is short and the specific heavier component of the fluid travels only a short distance before it meets an oblique surface which leads it to the bottom part of the conical chamber.

Central placement of the inner bag in the middle of the rotor, combined with a limited expansion in the radial direction, means that the fluid which is taken up in the inner bag is subjected to a limited field of force. This has shown itself to be particularly important when recovering particle suspensions, e.g. thrombocyte suspensions, since a re-sedimentation and undesirable aggregate formation of the particles must be avoided.

The bag-set according to the present invention is also particularly suitable for the recovery of bone marrow cells by centrifugal separation of bone marrow suspensions.

BRIEF DESCRIPTION OF THE DRAWINGS

The present invention will now be described in more detail with reference to the accompanying figures, in which.

DETAILED DESCRIPTION

Figure 1:
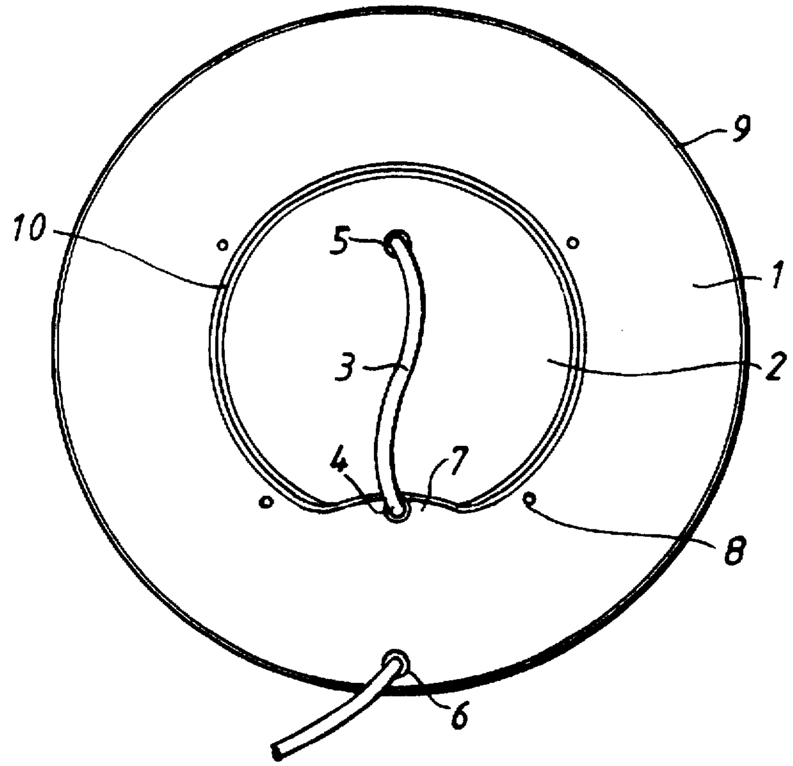
FIG. 1 is a top, elevational view of an embodiment of an outer and an inner bag for a bag-set according to the present invention.

Referring to the Figures, in which like reference numerals refer to like elements thereof, FIG. 1 shows an embodiment of an essentially ring-shaped outer bag 1 and a central, essentially circular, inner bag 2 formed from the central portion of the ring. The interiors of the bags are joined with a tube 3 having an orifice 4 in the outer bag and an orifice 5 in the inner bag. The outer bag is provided with an additional connection 6 for supplying and removing fluid to and from the outer bag. The orifice 4 is placed in a radially inwardly directed bulge 7 of the outer bag. When the lighter enriched phase against the center of the rotor is pressed out of the outer bag after separation by means of pressure being applied thereto, vortex formation can easily occur around the outlet opening, and parts of the next phase can be sucked out. By placing the orifice 4 on a bulge which extends radially further inwardly than the other parts of the outer bag, and by forming the rotor so that this part of the bag forms a relatively narrow gap between the rotor and the rotor cover in the vertical direction, vortex formation around the orifice 4 can be avoided and the lighter phase can be recovered with both a high quality and high yield.

The outer bag is further provided with a number of attachment means, e.g. eyelets 8, for attachment of the outer bag onto a stiff center part, which will be described in more detail with reference to FIGS. 4–7.

The bags are produced by two plastic films being placed over each other and sealed together with an outer ring weld 9 and an inner ring weld 10. The latter weld is such that it either separates the bags totally from each other or makes them separable from each other by tearing off.

Figure 2:
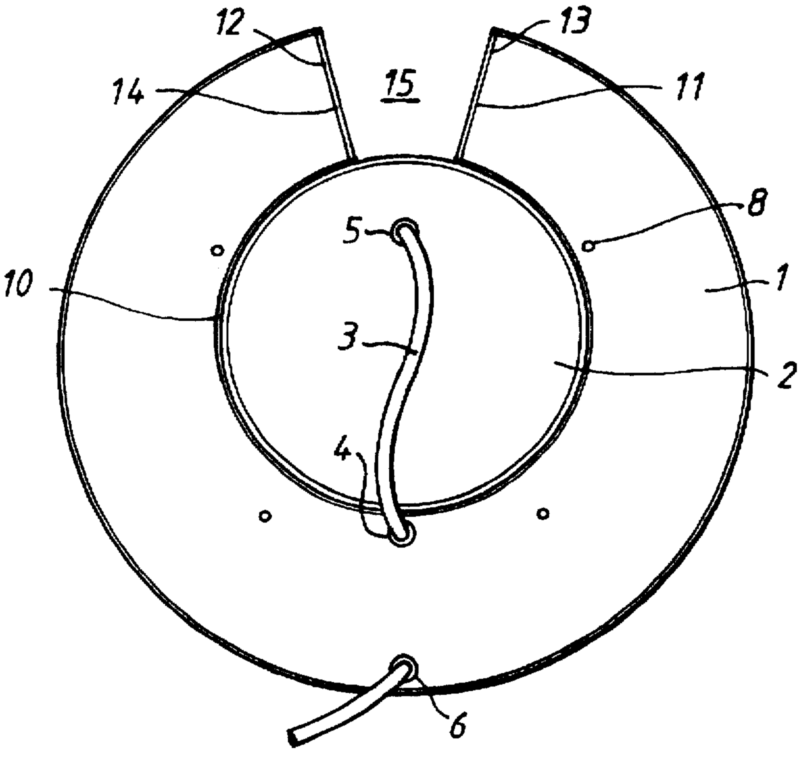
FIG. 2 is a top, elevational view of another embodiment of an outer and inner bag according to the present invention.

FIG. 2 shows a somewhat different embodiment of a bag according to the present invention, and differs from the embodiment which has been described with reference to FIG. 1 in that the inner ring weld 10 is somewhat eccentrically placed with respect to the outer circumference. The outer bag is thereby wider in the area of the orifice 4 of tube 3 in the outer bag. This wider portion fulfills the same function as the bulge 7 in the embodiment according to FIG. 1. The wider part of the outer bag is placed in a corresponding manner in the narrow gap between the rotor and the rotor cover. Details which correspond to each other in the figures have been denoted with the same reference numeral. The ring-shape of the outer bag is cut, and the resulting free ends 11 and 12 are closed. The cutting can e.g. be carried out by means of a weld, which at the same time seals the ends. In the embodiment shown in FIG. 2 the outer bag is cut with two substantially radially directed welds 13 and 14 at a certain distance from each other. The intermediate material piece 15 is removed. The essentially ring-shaped outer bag is thus free from any circulating inner fluid communication.

In order to reduce the diameter which is taken up by the bag-system and at the same time facilitate handling of the bags and fixing of same in their intended positions for centrifugation, a rigid circular mounting member 16 is used. The outer bag is mounted around the outside of the mounting member and the inner bag inside in an inner cavity 17 in the mounting member.

Figure 3:
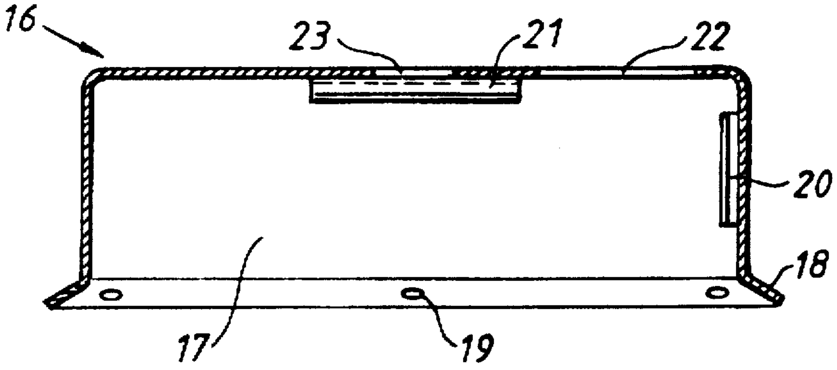
FIG. 3 is a side, elevational, partially cross-sectional view of a rigid mounting member for use with a bag-set according to the present invention.
Figure 4:
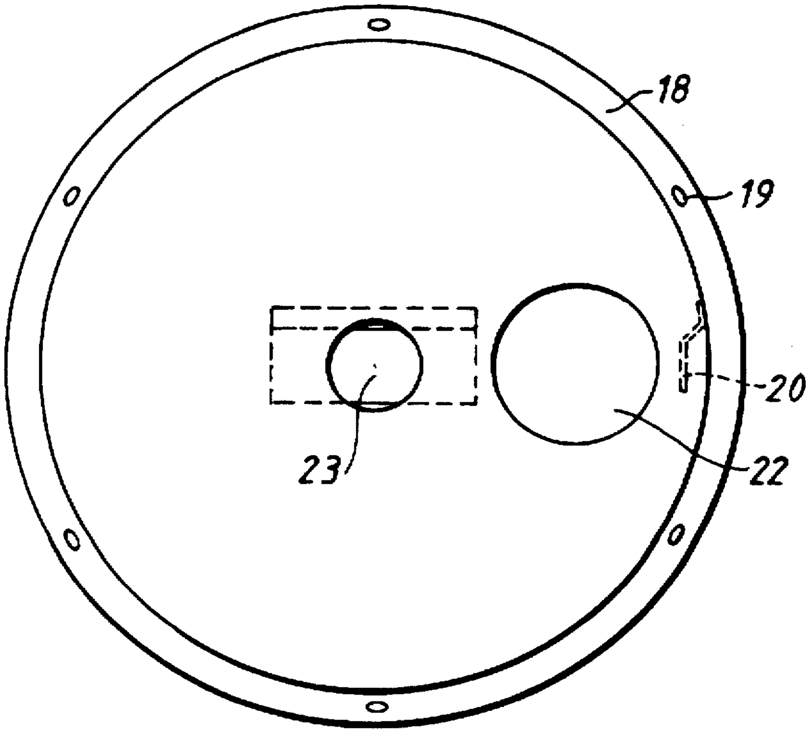
FIG. 4 is a top, elevational, sectional view of the mounting member according in FIG. 3.

The bag-set can thereby be lifted into and out of the rotor with a simple hand grip. FIGS. 3 and 4 show an embodiment of such a mounting member in the form of a downwardly-open cylinder. FIG. 3 shows a sectional view through the mounting member, and FIG. 4 shows the mounting member in horizontal section. The cylinder, at its open end, is provided with a conical inclined rim 18, in which the outer bag's inner edge is fastened in the fastening means 19 which cooperate with the fastening eyelets 8 in the outer bag. On its inside the cylinder has holders 20 and 21 for fixing the connection tube 3 between the outer and the inner bag, and is provided with openings 22 and 23 for access to the tube from the upper side of the mounting member, to allow attachment of clamp valves or optical sensors etc. onto the tube when the bag-system is placed in the rotor.

Figure 5:
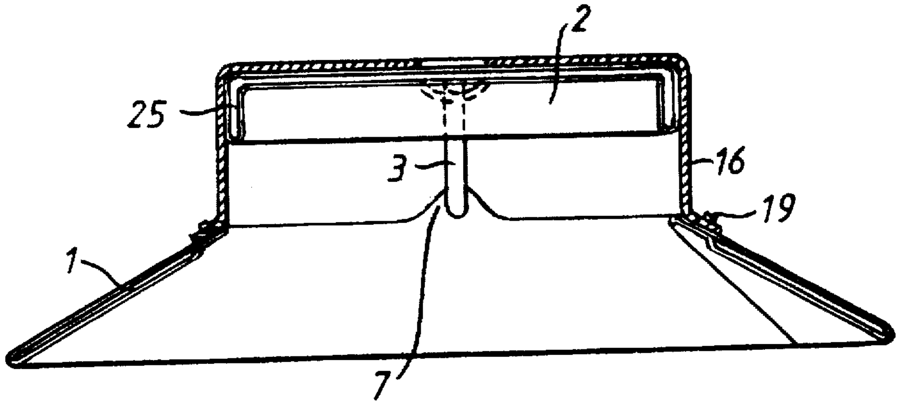
FIG. 5 is a side, elevational, sectional view of a bag-set according to the present invention utilizing a rigid mounting member according to FIGS. 3–4.
Figure 6:
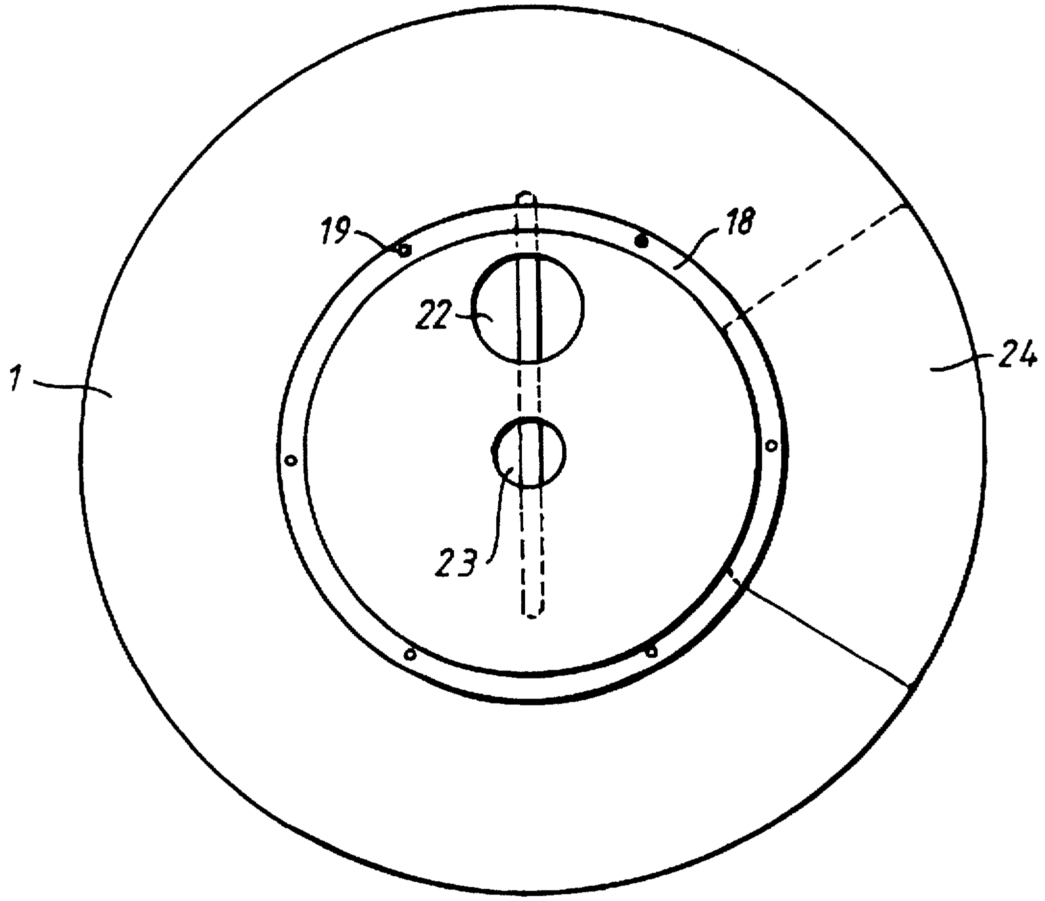
FIG. 6 is a top, elevational, partially cross-sectional view of the bag-set according to FIG. 5.

FIGS. 5 and 6 show a complete bag-system with the mounting member in section, and in horizontal view, respectively. The inner bag 2 is placed inside the mounting member 16, which is arranged to limit the radial spreading of the inner bag but to allow for axial expansion of the inner bag when this is filled with a fluid. In the figures a mounting member is shown in the form of a cylinder according to FIGS. 3–4. The cylinder has a smaller diameter than the bag which is pressed into the cylinder so that its peripheral part 25 is folded and rests against the inner surface of the cylinder. When the inner bag is filled it expands in the vertical direction inside the cylinder. The folding of the inner bag's peripheral part, which is the result of its having a larger diameter than the mounting member 16, has shown itself to have only a marginal impact upon the maximum volume which can be taken up in the inner bag.

The outer bag 1 has too large a diameter for its inner edge to fit onto the rim 18. In connection with mounting onto the center part, the ring-shaped outer bag is shortened by a section of the ring being drawn together into a fold 24 which is laid onto the ring. The continuous fluid communication in the ring is thereby broken. In the case where the ring is cut by a weld or the like, the ring is shortened by the end being laid in overlapping relationship. With shortening of the ring, the bag will assume a conical shape without being folded, and can easily be fastened to the conically inclined rim 18 formed in the same way on the cylinder 16. In this way the bag-system has a small diameter and can be used in small centrifuge rotors despite the bags being manufactured with a diameter which is dependent on the volume which the inner bag 2 is desired to have, i.e. the central section of the outer bag.

Figure 7:
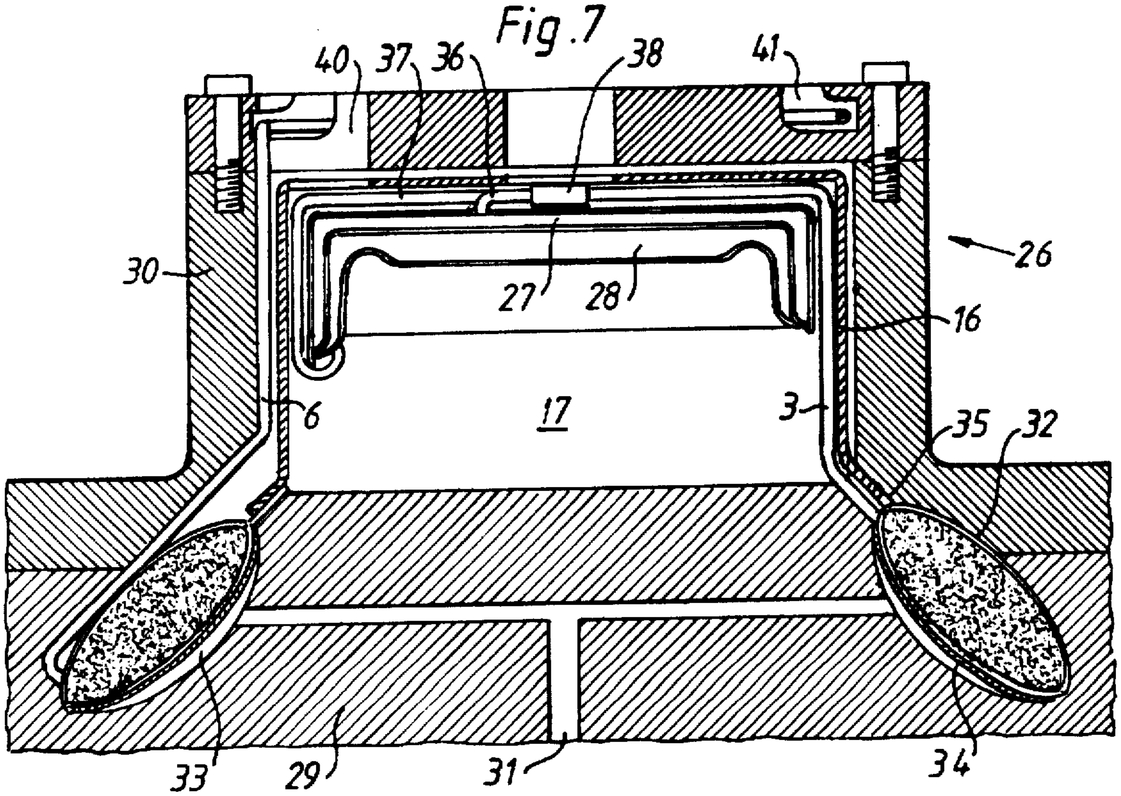
FIG. 7 is a side, elevational, sectional view of a bag-set according to the present invention with double inner bag chambers, mounted in a centrifuge rotor.
Figure 8:
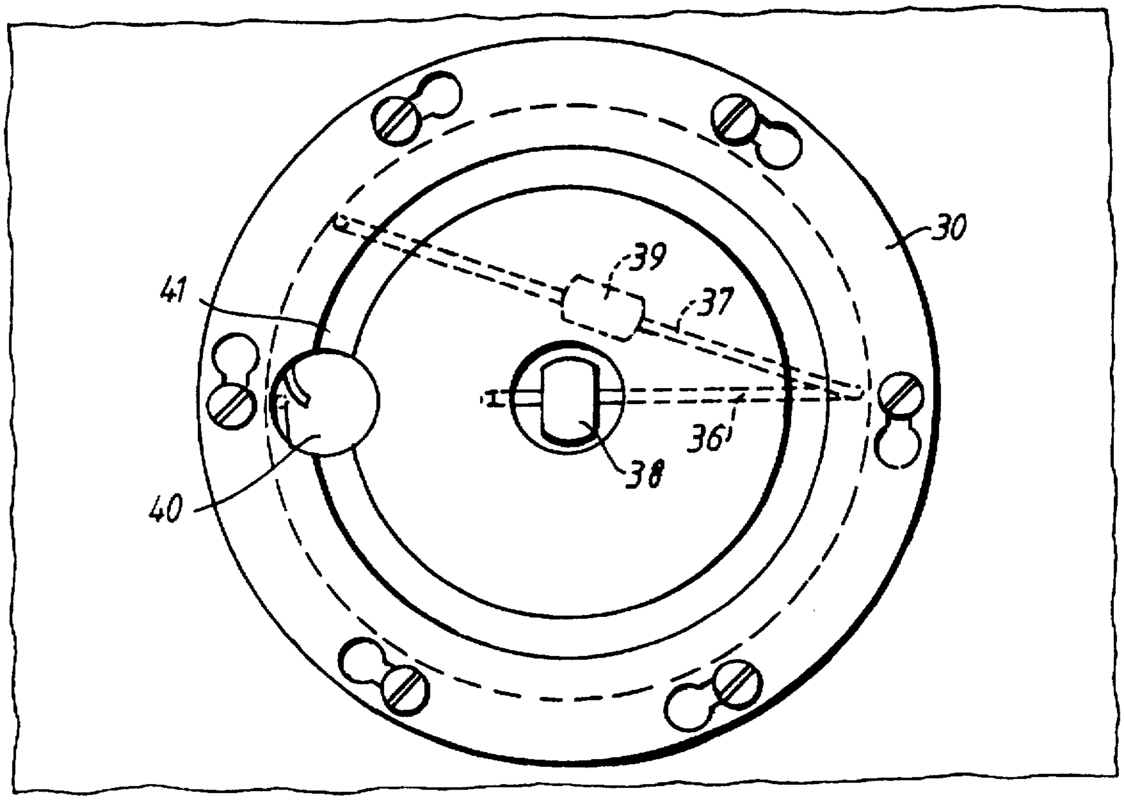
FIG. 8 is a top, elevational view of the centrifuge rotor for use in accordance with the present invention.

FIG. 7 shows a section through a bag-system placed in a centrifuge rotor 26 adapted to the system hereof. In this case the bag-set has an inner bag with an upper chamber 27 and a lower chamber 28. FIG. 8 shows the rotor as seen from above. Reference numeral 29 denotes the base of the rotor, and reference numeral 30 its cover. A channel 31 for hydraulic fluid passes through the axis of the rotor to the rotor's ring chamber 32 where a ring-shaped hydraulic chamber 33 is delimited from the rest of the ring chamber by a membrane 34. The outer bag is placed in the ring chamber, and its bulging portion 7 is positioned in the gap 35 between the base of the rotor and its cover. The connection tube 3 which has an orifice in the bulge 7 in the outer bag, branches into a branch 36 which has an orifice in the upper inner bag chamber 27 and a branch 37 which has an orifice in the lower chamber 28. The branch conduits are placed in clamp valves 38 and 39 which are controlled by the programmed operation of the centrifuge and/or photocells which detect displacement of the boundary surface of the phase in the connection tube 3. The outer bag is connected with an additional tube 6 which is drawn up through the hole 22 in the mounting member and further through a hole 40 in the rotor cover. The tube is used for filling the outer container with the fluid which is to be separated, and is thus accessible from the outside of the rotor. After filling of the outer container the tube is closed with tube welding tongs and is placed in a groove 41 in the rotor cover.

Instead of a branched connector tube 3, the outer bag can be connected to each of the chambers in the inner bag by means of separate tubes and one-way valves.

The bag-set according to the present invention can thus be used for the separation of blood and other biological fluids and with treatment of such fluids with different components. The system with double inner bag chambers and a branched connector tube between outer and inner bags can be used when a separation into three different fractions should occur. Two fractions are each led to their respective inner bag chamber, and the third fraction remains in the outer bag.

Figure 9:
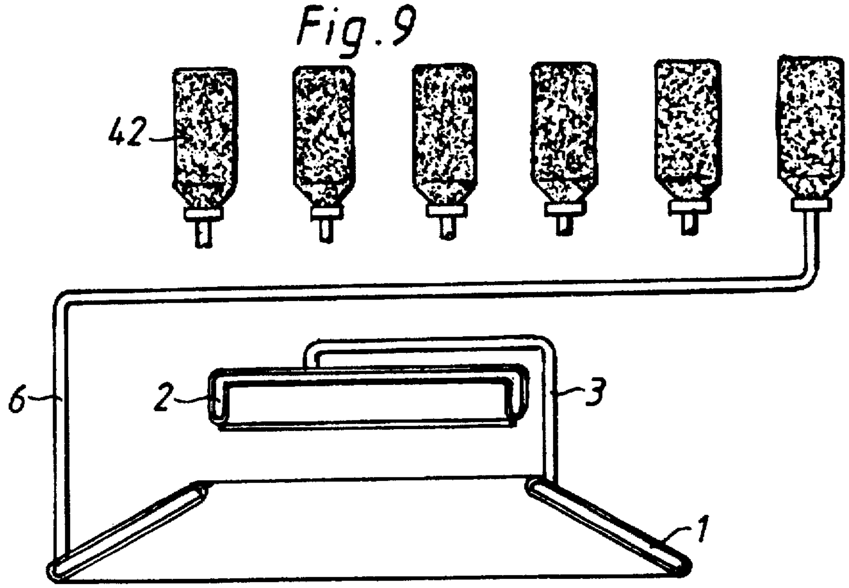
FIG. 9 is a side, elevational, schematic view showing use of a bag-set according to the present invention during recovery of thrombocyte suspension.
Figure 10:
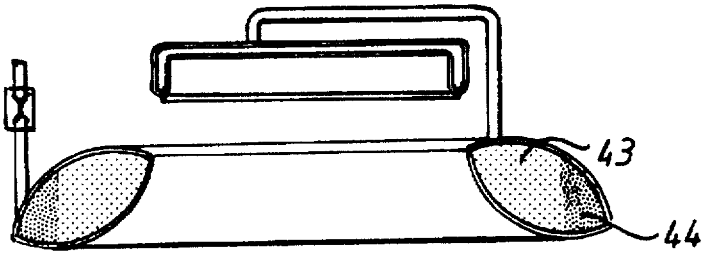
FIG. 10 is a side, elevational, schematic view showing a further stage of use of a bag set according to the present invention during recovery of thrombocyte suspension.
Figure 11:
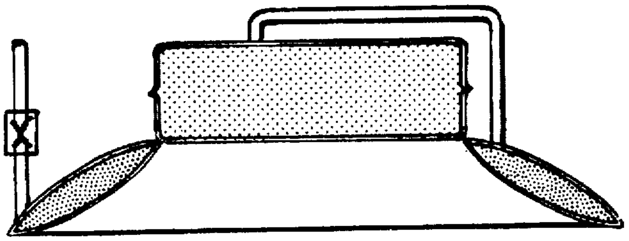
FIG. 11 is a side, elevational, schematic view showing a further stage of use of a bag set according to the present invention during recovery of thrombocyte suspension.

The bag-set according to the present invention is specially adapted for recovering thrombocyte suspensions from isolated buffycoat fractions, which is schematically shown in FIGS. 9–11. Buffycoat is recovered as an intermediate fraction by centrifugal separation of whole blood. A number of buffycoats 42, e.g. six, are transferred through tube 6 to the outer bag 1, upon which the tube 6 is cut and sealed with tube welding tongs (FIG. 9). The buffycoats are centrifuged and divided up in a thrombocyte-rich plasma 43 and a remaining volume 44 (FIG. 10). This centrifugation occurs with a certain amount of care in order to avoid centrifuging out of the thrombocyte cells. The conical angulation of the outer bag and the relatively small diameter are thereby a large advantage. Pressure is thereafter brought to bear on the outer bag, and the thrombocyte suspension is pressed during on-going centrifugation via the tube 3 to the inner bag 2 (FIG. 11). The inner bag will thereby expand in the vertical direction, while its radial expansion is fixed by the mounting member (not shown).

Since the thrombocyte suspension is transferred to the center of the rotor and is maintained in a limited area in the radial direction, it will only be subjected to a weak centrifugal force as soon as it is recovered. If the thrombocyte suspension is subjected to a lengthy strong centrifugal force, an undesired aggregate formation occurs, along with a loss of thrombocyte cells. The special requirements which are made for recovery of thrombocyte suspension of high quality and high yield are thus fulfilled by the bag-set according to the present invention.

Another field of application in which the bag-set according to the present invention is especially suitable is bone marrow separation. Bone marrow separation is applied in connection with cancer treatments using large doses of radiation treatment. Bone marrow is taken out of the patient before the radiation treatment and, through various separations and washing procedures, bone marrow cells are isolated which are re-transfused after the radiation treatment.

A known procedure for isolation of bone marrow cells comprises the following steps:

a) centrifugal separation of bone marrow suspension in three fractions and collecting the intermediate fraction, or buffycoat;

b) the buffycoat fraction from step (a) is centrifuged one more time in a separation fluid, commonly Ficoll (a trademark of Pharmacia Fine Chemicals AB), and an intermediate fraction which contains the bone marrow cells is collected; and c) washing of the collected fraction from step (b) for recovery of re-transfusable bone marrow cells.

The bag-set according to the present invention can be used in such a process in the following manner:

In step (a) a bag-set with double chambers in the inner bag is used, including a branched connection conduit from the outer bag to the inner bags, i.e. of the type which is shown in FIG. 7. The outer bag is supplied with a batch of bone marrow suspension, which by means of centrifugation is divided up into plasma, buffycoat (comprising the bone marrow cells) and remaining products. Due to the influence of pressure on the outer bag the plasma fraction is thereafter pressed, during on-going rotation, to the first inner bag, and thereafter a determined amount of buffycoat is pressed to the second inner bag, the remaining products being left in the outer bag.

In step (b) a similar bag-system as in step (a) is used. The separation fluid (Ficoll) is supplied to the outer bag and a suspension of the buffycoat fraction from step (a) is added carefully so that it forms a layer above the separation fluid. The centrifuge is started slowly so that mixing is avoided. Depending on the specific weight of the cells, they will migrate through the separation fluid or stay above same during centrifugation. The bone marrow cells are enriched in a layer above the separation fluid. The supernate (plasma) is thereafter pressed, during on-going centrifugation, into the first inner bag chamber, and thereafter an intermediate fraction consisting of the layer closest above the separation fluid (containing the bone marrow cells) is pressed into the second inner bag chamber. The heavier cell material remains in the outer bag.

In step (c) a bag-system with a single chamber inner bag can be used, i.e., of the type which is described with reference to FIG. 5. The fraction of bone marrow cells contaminated with separation fluid from step (b) is transferred to the outer bag, and a suitable washing fluid is supplied. After centrifugation the used washing fluid is pressed out into the inner bag. New washing fluid can then be supplied to the outer bag via a tube (such as that shown in FIG. 7), which is accessible from the outside of the rotor cover, and the washing procedure can be repeated as required. The washed bone marrow cells are isolated in the outer bag.

With the bag-set according to the present invention a cheaply priced treatment set can be obtained, which allows for the separation of biological fluids during on-going centrifugation into separate component containers without the fluids passing complicated, expensive and sterility-unsafe rotating couplings. Despite a small diameter, which can be adopted to an existing centrifuge type, relative large volumes can be taken up in the inner bag. The bag-system is therefore useable for many different types of separations.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

We claim:

1. Apparatus for use in a centrifugal separator, said apparatus comprising an inner circular bag portion having an outer diameter, an outer annular bag portion having an inner diameter corresponding to said outer diameter of said inner circular bag portion, and a connecting channel for providing fluid communication between said inner circular bag portion and said outer annular bag portion, said outer annular bag portion being separable from said inner circular bag portion and including an interrupted portion, and including a pair of end portions defining said interrupted portion, whereby said outer annular bag portion adopts said conical configuration by wrapping said pair of end portions over each other to thereby shorten said inner diameter of said outer annular bag portion.

2. The apparatus of claim 1 wherein said end portions of said outer annular bag portion are defined by a pair of cuts in said outer annular bag portion removing a predetermined length of said outer annular bag portion.

3. Apparatus for use in a centrifugal separator, said apparatus comprising an inner circular bag portion having an outer diameter, an outer annular bag portion for arrangement around said inner circular bag portion, and a connecting channel providing fluid communication between said inner circular bag portion and said outer circular bag portion, said connecting channel being connected to said outer annular bag portion at a connecting point thereon, said outer annular bag portion being eccentrically disposed with respect to said inner circular bag portion, whereby said outer annular bag portion includes a first width on a first side thereof and a second width on a second side thereof, said first width being greater than said second width, and wherein said connecting point is located at said first width.

4. The apparatus of claim 3 wherein said connecting point is located adjacent to the inner diameter of said outer annular bag portion.

5. A bag set for use in the separation of fluids by centrifugation in a centrifuge of a type having a rotor with a processing space concentric to the axis of rotation of said rotor, said processing space comprising a central rotor compartment and a conical, annular rotor compartment, and having means for reducing the volume of said annular rotor compartment during rotation of said rotor, said bag set being intended for insertion into said processing space and comprising a rigid circular mounting member adapted to fit into said central rotor compartment, said mounting member including an inner cavity extending in the direction of said axis of rotation of said rotor, an outer essentially ring-shaped bag of flexible material mounted around said mounting member in a conical configuration and adapted to fit into said annular rotor compartment and be supplied with said fluid which is to be separated, an inner circular bag of flexible material separable from said outer ring-shaped bag and mounted in said inner cavity and adapted to receive a fluid from said outer bag when the volume of said annular rotor compartment is reduced, said inner cavity being arranged to limit the spreading of said inner bag in the radial direction of said rotor but to allow expansion of said inner bag in the direction of said axis of rotation of said rotor when said inner bag is filled with a fluid, and a connecting tube for providing fluid communication between said outer conically configured ring-shaped bag and said inner bag in said inner cavity.

6. The bag set of claim 5 wherein said inner circular bag and said outer ring-shaped bag are detachably formed from superposed sheets of plastic film material, whereby said inner circular bag is formed from a central portion surrounded by said outer ring-shaped bag.

7. The bag set of claim 6 wherein said outer ring-shaped bag is eccentrically disposed with respect to said inner circular bag, whereby said outer bag includes a first width on a first side thereof and a second width on a second side thereof, said first width being greater than said second width, and wherein said connecting tube is connected to said outer bag at said first width.

8. The bag set of claim 5 wherein said outer ring-shaped bag comprises a ring section having a fold directed substantially radially across said ring section, said folded section being laid onto said ring as an overlap when said outer ring-shaped bag is mounted around said mounting member in said conical configuration.

9. The bag set of claim 5 wherein said outer ring-shaped bag comprises a pair of opposed, sealed end portions, said pair of end portions overlapping each other when said ring-shaped bag is mounted around said mounting member in said conical configuration.

10. The bag set of claim 5 wherein said connecting tube is connected to said outer ring-shaped bag at an area of said bag which is situated closest to the axis of rotation of said rotor when said bag set is positioned in said processing space.

11. The bag set of claim 10 wherein said outer ring-shaped bag comprises a radially inwardly projecting portion, and wherein said connecting tube is connected to said outer ring-shaped bag in said radially inwardly projecting portion.

12. The bag set of claim 5 wherein said circular inner bag comprises at least two bag chambers comprising first and second bag chambers.

13. The bag set of claim 12 including a plurality of connecting tubes for providing fluid communication between said outer bag and each of said first and second bag chambers.

14. The bag set of claim 5 wherein said connecting tube is branched and comprises at least first and second tube branches connected to said first and second bag chambers.

15. A method for centrifugal separation of bone marrow cells from bone marrow suspensions utilizing the bag set of claim 14 and a centrifuge of a type having a rotor with a processing space concentric to the axis of rotation of said rotor, which processing space comprises a central rotor compartment and a conical annular rotor compartment, and having means for reducing the volume of said annular rotor compartment during rotation of said rotor, said method comprising supplying said bone marrow suspension to said outer ring-shaped bag, centrifuging said bone marrow suspension to separate said bone marrow suspension to a light plasma fraction, an intermediate buffycoat fraction, and a denser fraction of remaining products, expelling said light plasma fraction from said outer bag to said first bag chamber through said branched connecting tube and thereafter expelling said intermediate buffycoat fraction to said second bag chamber through said branched connecting tube during rotation of said rotor by reducing the volume of said annular rotor compartment, and collecting said intermediate buffycoat fraction from said second bag chamber for continued separation.

16. The method of claim 15, wherein said bag set comprises a first bag set and including providing a second bag set, supplying a separation fluid to said outer ring-shaped bag of said second bag set, supplying said intermediate buffycoat fraction collected in said first bag set as a layer above said separation fluid in said outer bag of said second bag set, centrifuging said collected fraction with said separation fluid in said outer bag of said second bag set to separate said collected fraction into a light plasma fraction, an intermediate fraction disposed in a layer above said separation fluid and a denser fraction, expelling said light plasma fraction from said outer bag of said second bag set to said first bag chamber of said second bag set through said branched connecting tube, and thereafter expelling said intermediate fraction to said second bag chamber of said second bag set through said branched connecting tube during rotation of said rotor by reducing the volume of said annular rotor compartment, collecting said intermediate fraction containing said bone marrow cells from said second bag chamber of said second bag set for continued treatment, and washing said collected intermediate fraction to obtain re-transfusible bone marrow cells.

17. A method for centrifugal separation of thrombocyte suspensions from buffycoat obtained from separations of whole blood utilizing the bag set of claim 5 and a centrifuge of a type having a rotor with a processing space concentric to the axis of rotation of said rotor, said processing space comprising a central rotor compartment and a conical annular rotor compartment and having means for reducing the volume of said annular rotor compartment during rotation of said rotor, said method comprising supplying said buffycoat to said outer ring-shaped bag, centrifuging said buffycoat to separate said buffycoat into a light phase comprising said thrombocyte suspension and a denser phase of remaining products, expelling said thrombocyte suspension from said outer bag to said inner bag through said connecting tube during rotation of said rotor by reducing the volume of said annular rotor compartment, and obtaining said thrombocyte suspension in said inner bag.

18. Apparatus for use in a centrifugal separator comprising an inner circular bag portion having an outer diameter, and an outer annular bag portion having an inner diameter corresponding to said outer diameter of said inner circular bag portion, and a connecting channel for providing fluid communication between said inner circular bag portion and said outer annular bag portion, said outer annular bag portion including an interrupted portion and a pair of end portions defining said interrupted portions, said end portions being defined by a pair of cuts in said outer annular bag portion removing a predetermined length of the said outer annular bag portion, whereby said outer annular bag portion can adopt a conical configuration by wrapping said pair of end portions over each other to thereby shorten said inner diameter of said outer annular bag portion.

* * * * *

UNITED STATES PATENT AND TRADEMARK OFFICE
CERTIFICATE OF CORRECTION

PATENT NO. : 5,723,050

DATED : March 3, 1998

INVENTOR(S) : Unger et al.

It is certified that error appears in the above-identified patent and that said Letters Patent is hereby corrected as shown below:

Column 4, line 67, "according" should read --shown--.

Column 10, line 42, "claim 5" should read --claim 12--.

Signed and Sealed this

Twenty-third Day of June, 1998

*Attest:*

BRUCE LEHMAN

*Attesting Officer* — *Commissioner of Patents and Trademarks*